United States Patent [19]

Anderson

[11] Patent Number: 4,999,900
[45] Date of Patent: Mar. 19, 1991

[54] METHOD FOR INSTALLING PRODUCT MONITORING DEVICE IN UNDERGROUND STORAGE TANKS

[76] Inventor: Robert V. Anderson, 4617 Ranch View Rd., Fort Worth, Tex. 76109

[21] Appl. No.: 546,674

[22] Filed: Jun. 29, 1990

Related U.S. Application Data

[63] Continuation of Ser. No. 370,047, Jun. 22, 1989, abandoned.

[51] Int. Cl.[5] .................... B23Q 17/20; G01F 25/00
[52] U.S. Cl. .................................. 29/407; 29/434; 29/455.1; 29/506; 29/890.14; 73/149; 73/301
[58] Field of Search ............... 29/237, 272, 406, 407, 29/709, 434, 455.1, 506, 514, 705, 890.14; 73/49.1, 49.2, 149, 301; 285/138, 140, 141, 133.1, 162, 370

[56] References Cited

U.S. PATENT DOCUMENTS

| | | | |
|---|---|---|---|
| 3,922,008 | 11/1975 | Stiner et al. | 285/138 X |
| 3,958,313 | 5/1976 | Rossborough | 285/162 X |
| 4,094,537 | 6/1978 | Lyall | 285/370 X |
| 4,672,842 | 6/1987 | Hasselmann | 73/49.2 |
| 4,852,054 | 7/1989 | Mastandrea | 73/149 X |

OTHER PUBLICATIONS

"Precision Underground Storage Tank Test", Acutest Brochure, Acutest Corporation, Houston, Tex., 1987.

*Primary Examiner*—Joseph M. Gorski
*Assistant Examiner*—Peter Dungba Vo
*Attorney, Agent, or Firm*—Charles D. Gunter, Jr.

[57] ABSTRACT

A method is shown for installing a product monitoring device in an underground storage tank, such as the tanks used to store petroleum products. A product sensor is passed through the annular space defined between the tank riser pipe and fill pipe into the tank interior. The product sensor is used to sense representative characteristics of the product located within the tank interior.

10 Claims, 2 Drawing Sheets

4,999,900

METHOD FOR INSTALLING PRODUCT MONITORING DEVICE IN UNDERGROUND STORAGE TANKS

This application is a continuation of application Ser. No. 370,047, filed 06/22/89 now abandoned.

BACKGROUND OF THE INVENTION

1. Field of the Invention

The present invention relates to underground storage tank systems and to an improved method for installing a product monitoring device in such a tank with minimum disruption to the existing storage tank installation.

2. Description of the Prior Art

Underground storage tank systems are commonly employed for the storage of petroleum, hazardous chemicals and other products. For instance, most gasoline service stations, truck stops and similar facilities employ underground fuel storage tanks which are refilled by means of a riser pipe which extends upwardly from the buried tank into a relatively shallow manhole in the concrete apron of the location. The sides of the manhole are spaced a sufficient radial distance from the riser pipe to provide convenient access for coupling and uncoupling the supply hose of a supply truck to the top of the riser pipe. A fill tube extends within the riser pipe into the interior of the tank and is spaced concentrically within the riser pipe to thereby define an annular space between the fill tube and the riser pipe. The bottom of the manhole can be open or closed, e.g., cemented or filled with dirt or a mixture of pea gravel.

It is often advantageous to install a product monitoring device within the interior of the underground storage tank, e.g., to report product levels for inventory control purposes, or in special operating modes to detect tank leakage.

The present invention has as its object to provide a simple and economical method for installing a product monitoring device in an underground storage tank.

The present invention also has as its object to provide an improved installation method for such a device in an underground storage tank which allows minimum disruption to the existing storage tank installation, including the existing concrete apron which covers the buried storage tank.

Additional objects, features and advantages will be apparent in the written description which follows.

SUMMARY OF THE INVENTION

The method of the invention allows installation of a product monitoring device in an underground storage tank of the type having an interior space and having a riser pipe extending upwardly therefrom to the surface, the riser pipe having an open interior which communicates with the tank interior space. In the method of the invention, spacer means are installed within the riser pipe open interior for creating an annular space between the spacer means and the riser pipe. A product sensor is supported in the annular space thus created between the spacer means and the riser pipe open interior. The product sensor is used to sense representative characteristics of the product located within the tank interior, such as the product level.

The spacer means can conveniently comprise a fill tube in a coaxial vapor recovery refueling arrangement. In such arrangements, the fill tube is spaced concentrically within the riser pipe to thereby define an annular space between the fill tube and the riser pipe. The product sensor can be installed in the existing annular space. In other refueling arrangements, the spacer means can comprise a rod or separate tube which is installed in the riser pipe to create an annular space, either concentric or nonconcentric, between the spacer means and the riser pipe.

DETAILED DESCRIPTION OF THE INVENTION

Figure 1:
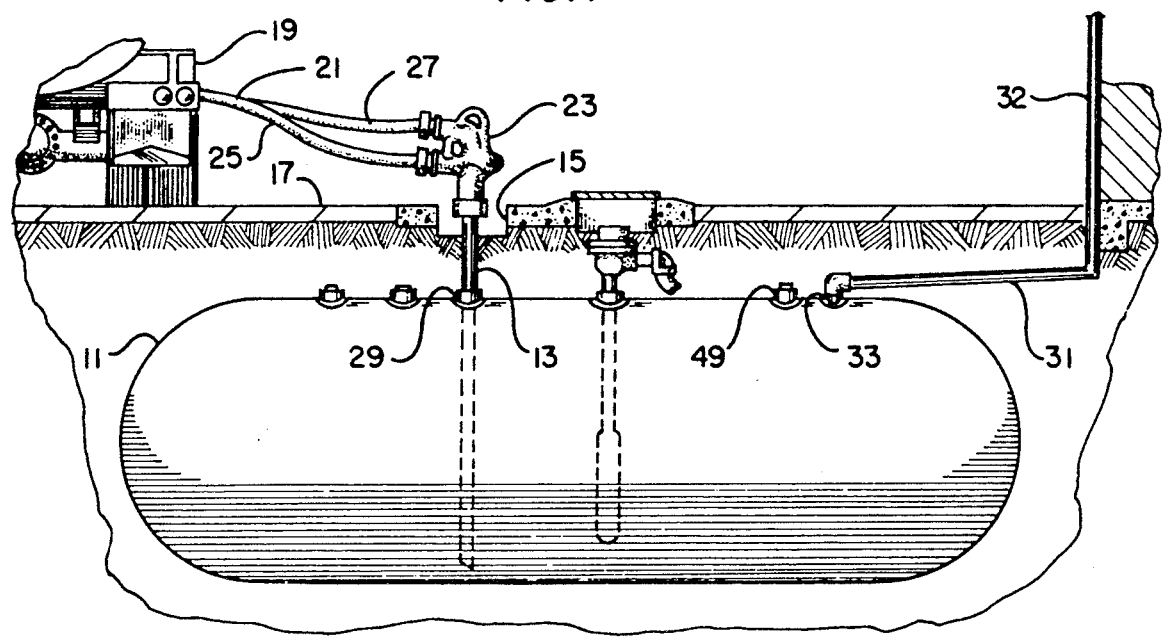
FIG. 1 is a side elevation view schematically illustrating a supply transport truck which is supplying fuel to a prior art underground fuel storage tank equipped with a riser pipe.

FIG. 1 shows a conventional underground storage system for petroleum, hazardous chemicals, or similar products. In the embodiment illustrated, the storage system is an underground fuel storage system of the type used to store petroleum products. The storage system including an underground tank 11 which is refilled by means of a riser pipe 13 extending upwardly therefrom. The riser pipe 13 extends upwardly from the buried tank 11 into a relatively shallow manhole 15 in the concrete apron 17 of a service station. A supply truck 19 has a supply hose 21 which is coupled to the riser pipe 13 by means of a liquid-vapor coupling 23. The coupling 23 is divided into a liquid passage 25 for supplying liquid through the riser pipe 13 to the tank 11 and a vapor passage 27 for simultaneously exhausting tank vapor back to the supply truck 19. The liquid vapor coupling 23 will be familiar to those skilled in the art and is commercially available, e.g., from Emco Wheaton of Conneaut, Ohio as the Model F298 coaxial elbow coupling.

In addition to the riser pipe 13 which extends from a tank bung 29 of the tank 11, the tank also includes a vent line 31 leading from a tank bung 33. The vent line 31 extends from the tank bung 33 on a rising slope to a vertical extent 32 which extends a substantial distance above the ground.

Figure 2:
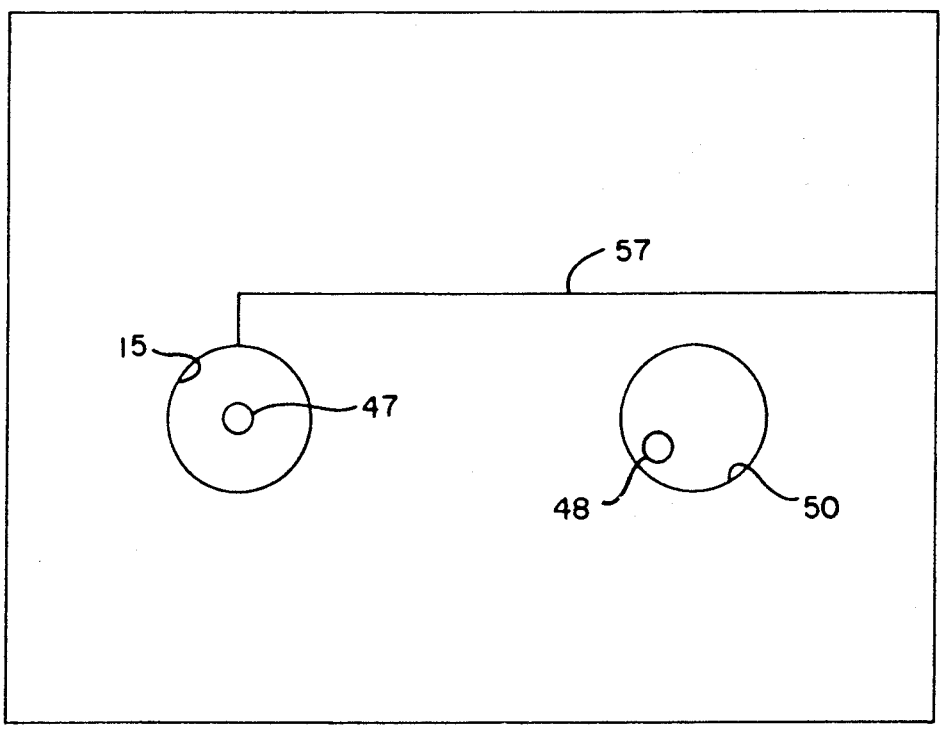
FIG. 2 is a top view of a portion of a concrete apron of the type which surrounds the underground storage tank of FIG. 1.
Figure 3:
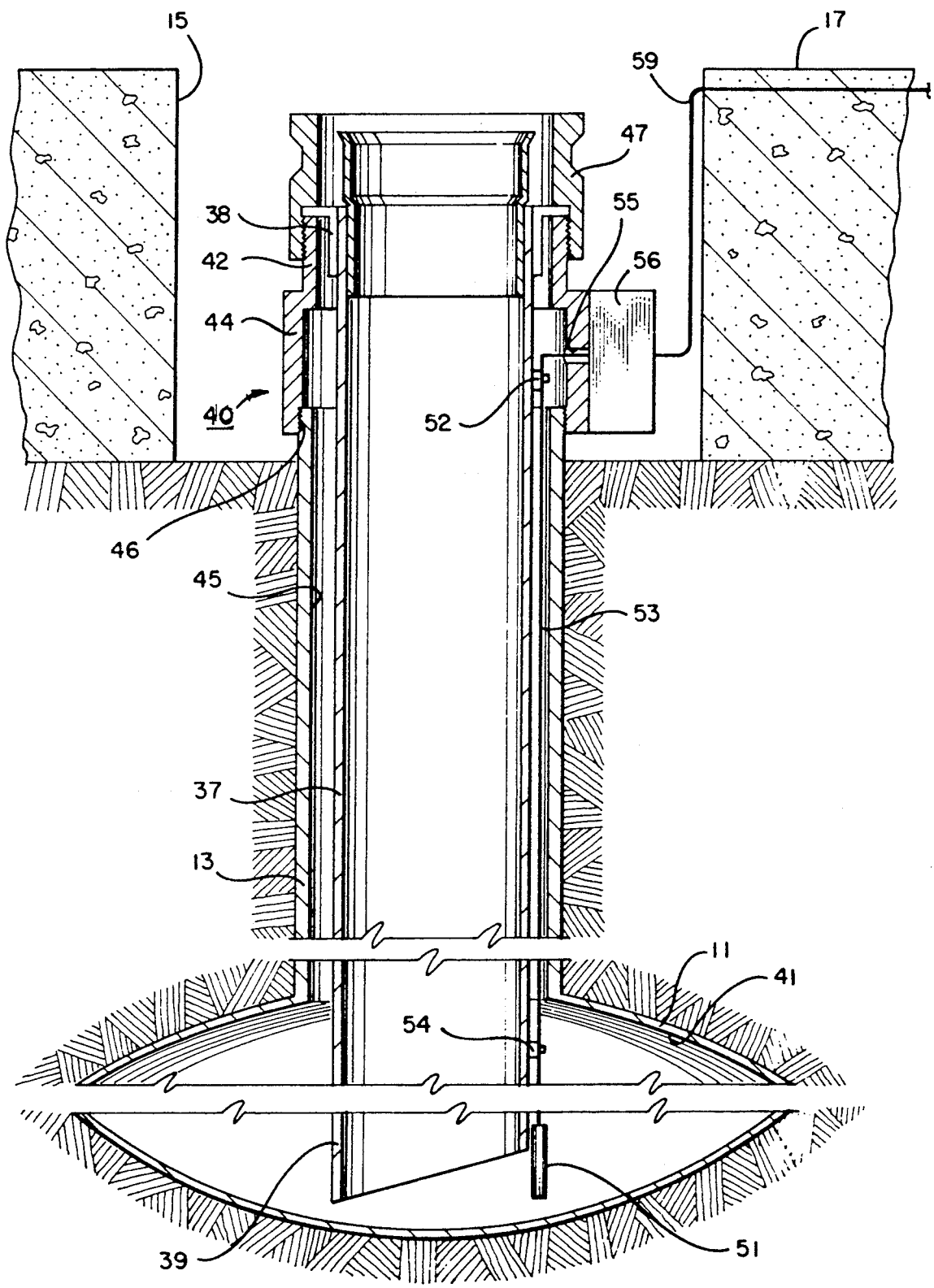
FIG. 3 is a partial, sectional view of the riser pipe and fill tube of the underground storage tank of FIG. 1, showing the installation of the sensing probe used in the method of the invention.

FIG. 3 is a close-up, sectional view of the riser pipe 13 and fill tube 37 found in the conventional underground storage tank 11 of FIG. 1, commonly referred to as a "coaxial vapor recovery system." The fill tube 37 has a lower end 39 which extends downwardly within the riser pipe 13 into the interior 41 of the underground fuel storage tank 11. The fill tube 37 is spaced concentrically within the riser pipe 13 to thereby define an annular vapor space 45. Fill tube 37 thus comprises a spacer means for creating the annular space used by the product sensor to be subsequently described. In the embodiment of the invention illustrated in FIG. 3, the fill tube 37 is centered within the riser pipe 13 by means of a centering means, in this case collar 38, to create a concentric annular space 45. However, for purposes of this invention, the annular space can be non-concentric as well, as shown by the fill tube 48 in FIG. 2 which creates a non-concentric annular space 50.

Returning to FIG. 3, an adapter 40 having a first cylindrical extent 42 and a second cylindrical extent 44 of greater external diameter engages an upper end of the riser pipe 13. For instance, the cylindrical extent 44 can be internally threaded at 46 to engage the mating threads of the riser pipe 13, allowing the adapter to be screwed onto the upper end of the riser pipe. The adapter first cylindrical extent 42 is externally threaded and engages the mating internal threads of a nozzle coupling 47 which is provided with an external profile adapted to engage the liquid-vapor coupling (23 in FIG. 1).

While the method of the invention is illustrated with respect to a typical "coaxial vapor recovery" arrangement, it will be understood that the invention applies as well to other arrangements, such as dual point recovery arrangements. In such arrangements, the spacer means can comprise an inner tube which is installed within the riser pipe or a solid rod or other object which is installed as the spacer means prior to installing the product sensor.

As previously described, the manhole 15 is a generally cylindrical opening providing a sufficient radial clearance to allow the attachment of the liquid-vapor coupling 23. The manhole is installed within the concrete apron 17 surrounding the riser pipe 13. The size of the opening is thus fixed and cannot be readily enlarged without tearing out the existing concrete 17.

Previous product sensing devices were typically installed by tearing out the existing concrete apron at one of the additional bungs, i.e., 49 in FIG. 1. Such a retrofit operation usually meant that one or more days of retail sales were disrupted while the concrete apron was torn out and replaced. The installation itself was also quite expensive in terms of man hours and materials.

In the method of the invention, as illustrated in FIG. 3, a product sensor, such as level sensor 51, is passed through the existing annular space 45 created by the fill tube 37 into the tank interior 41. Preferably, the sensor 51 is a commercially available capacitance level probe of an appropriate diameter to pass through the annular space 45. Capacitance level probes are known in the art and feature a central conductor spaced apart from an outer tube by a void area. As the void is replaced by liquid, the capacitance of the device changes, allowing an extremely precise measurement of changes in liquid level. A suitable level sensor is commercially available from Centroid Products of Edgewater, Fla., as the "Underground Storage Tank Remote Level Sensing Device." Preferably, the sensor is concentrically shaped and is approximately $\frac{1}{4}''$ in outer diameter.

The sensor 51 is supported in the annular space 45 by support means, such as by cable 53, which runs through the annular space 45 and out the aperture 55 of the adapter 40. The cable 53 is attached at intervals to the fill tube 37, as by clamps and rivets, 52, 54 to prevent sway in the tank liquid. In the embodiment shown, the cable joins a junction box 56, which acts as a transmitter for the capacitance level sensor 51.

Cable means, such as connector cable 59 are run from the junction/transmitter 56 to a remotely located readout unit (not shown) by running the cable from the manhole 15 through a shallow trench (57 in FIG. 2) to the readout unit which is usually located within the retail establishment. The cable can be, e.g., wire, coaxial or multiconductor cable and is preferably U.L. approved for direct burial. Preferably, the cable is $\frac{1}{4}''$ diameter multiconductor cable.

The shallow trench is preferably saw cut approximately $\frac{1}{4}$-$\frac{3}{8}''$ wide and 2" deep, as by using a diamond bladed concrete saw. The trench is cut through the wall of the manhole 15, through the concrete apron 17, and can be continued through any adjacent sidewalks and into the building housing the remote readout. Five or more $\frac{1}{4}''$ diameter multiconductor cables from a plurality of underground tanks can then be stacked, one upon the other, within the 2" deep trench. The top of the trench 57 is then caulked with a mortar caulking once the cable or cables 59 are installed. Because of the small width and shallow depth of the sawcut trench, the end result has the appearance of an expansion joint in the concrete apron (see FIG. 2).

Level sensors of the type under consideration and the associated computation means will be familiar to those skilled in the art. In addition to the capacitance level probe 51 previously described, any conveniently available sensing device can be utilized, assuming the device is sized to pass through the annular space 45 into the tank interior. U.S. Pat. No. 4,672,842, issued June 16, 1987, to Hasselmann, describes two prior art sensing arrangements, the disclosure of which is incorporated herein by reference In one embodiment, the sensor is a sensitive thermistor connected to a Wheatstone bridge, the output of which is fed to a computer. Based on temperature changes of the liquid in the tank, the computer determines the liquid volume change due to thermal expansion or contraction and balances that against the actual volume changes determined by the amount of liquid pumped in or out of the tank. The resultant information, including actual temperatures and actual volume of fluid transported between the tanks, together with a calculation of leak rate, is indicated on a display or alternatively a strip chart printer, or both. Clock means are provided in the computer to measure the time interval between measurements and thereby to calculate the leak rate.

In another embodiment, the sensor can embody a linear voltage differential transformer (LVDT). For instance, level change indication signals from the LVDT are coupled to the computer through an A/D converter. The output signals result from the longitudinal movement of a small rod within a central bore of an outer sleeve of the sensor. A nonmagnetic extension of the central rod extends downwardly into the tank, supported by a float ball at the liquid surface. The signals from the LVDT accurately represent liquid level changes and are coupled to a computer where they are converted to volumetric changes.

Other product sensing devices can be utilized as well with the method of the invention, including those used to sense vacuum, water, and the like. By whatever method, it is only necessary for purposes of the present invention that the selected sensor 51 be of a requisite size to pass through an annular space 45 and that the sensor output a signal representative of characteristics of interest of the product in the storage tank 11.

The operation of the installation method of the invention will now be briefly summarized. The product sensing probe 51 is inserted into the interior 41 of the tank by first unscrewing the nozzle coupling 47 and pulling out the existing fill tube 37 and collar 38. The collar 38 is then placed on top of the adapter 40 and the nozzle coupling 47 is screwed onto the adapter 40. The cable 53 is then attached to the fill tube by means of clamps and rivets 52, 54. The complete assembly can then be inserted into the riser pipe 13 and with the threads 46 of the adapter 40 being engaged with the mating threaded surface of the riser pipe.

Alternatively, the fill tube 37 can be provided from the factory with the adapter 40 and the attached cable 53 so that the installation merely involves removing the existing fill tube 37 and installing the complete retrofit assembly. This procedure allows the annular space 45 to be varied to accommodate sensors 51 of varying sizes, for instance by providing fill tube 37 as a necked-down version of the fill tube shown in FIG. 3.

Once the fill tube 37 and associated support means and adapter have been installed, a cable 53 can be used to connect the probe to the remotely located computer and readout equipment by running an additional length of connector cable 59 through a shallow trench 57 provided in the concrete apron. The trench can then be caulked to produce an expansion joint appearance in the concrete apron.

An invention has been provided with several advantages. The installation method of the invention allows product monitoring devices to be installed on an underground storage tank with a minimum of disruption to the existing concrete apron or to the retail operations of the installation utilizing the underground storage tank. The installation method normally takes only a couple of hours time with minimal manual labor and materials. It is not necessary to tear out the existing concrete apron or manhole area.

While the invention has been shown in only one of its forms, it is not thus limited but is susceptible to various changes and modifications without departing from the spirit thereof.

I claim:

1. A method for installing a product monitoring device in an underground fuel storage tank having an interior space and having a riser pipe extending upwardly therefrom to the surface of the ground, the riser pipe having an open interior surface which communicates with the interior space of the underground fuel storage tank, the method comprising the steps of:

telescopingly installing a fill tube within said interior surface of said riser pipe, said fill tube having an upper end, a lower end and an exterior surface between the upper end and the lower end, thereby forming a coaxial vapor recovery refueling system having an annular space created between said exterior surface of said fill tube and said interior surface of said riser pipe, said annular space defining a return vapor passage of said system;

supporting a product sensor in the annular space thus created between the exterior surface of the fill tube and the riser pipe interior surface, the product sensor being used to sense representative characteristics of a product located within the tank interior space; and leaving the product sensor so supported within the annular space of the coaxial vapor recovery refueling system during refueling of the underground fuel storage tank.

2. The method of claim 1,
supporting said product sensor in the annular space thus created between the exterior surface of the fill tube and the riser pipe interior surface comprises attaching said product sensor to the exterior surface of the fill tube.

3. A method for installing a level monitoring device in an underground fuel storage tank having an interior space and having a riser pipe extending upwardly therefrom to the surface of the ground, the riser pipe having an open interior surface which communicates with the interior space of the underground fuel storage tank, the method comprising the steps of;

telescopingly installing a fill tube within said interior surface of said riser pipe, said fill tube having an upper end, a lower end and an exterior surface between the upper end and the lower end, thereby forming a coaxial vapor recovery refueling system having an annular space created between said exterior surface of said fill tube and said interior surface of said riser pipe, said annular space defining a return vapor passage of said system;

installing a centering means within the riser pipe interior for centering the fill tube within the riser pipe interior;

supporting a level sensor in the annular space thus created between the exterior surface of the fill tube and the riser pipe interior surface the level sensor being used to detect changes in a liquid level within the tank interior space for inventory control purposes; and leaving the level sensor so supported within the annular space of the coaxial vapor recovery refueling system during refueling of the underground storage tank, whereby fuel is supplied through the fill tube to the interior space of the underground fuel storage tank and vapor is simultaneously conducted through the annular space containing the level sensor.

4. A method for installing a product monitoring device in an underground fuel storage tank having an interior space, the tank being buried in a subterranean location beneath a concrete apron having a cross-sectional depth and having a riser pipe extending upwardly from said tank to the ground surface, the riser pipe having an open interior which communicates with the interior space of the underground fuel storage tank, the product monitoring device being used to output a signal representative of product characteristics of interest, the signal so output being monitored by computation means located at the surface of the ground, the method comprising the steps of;

telescopingly installing a fill tube within said interior surface of said riser pipe, said fill tube having an upper end, a lower end and an exterior surface between the upper end and the lower end, thereby forming a coaxial vapor recovery refueling system having an annular space created between said exterior surface of said fill tube and said interior surface of said riser pipe, said annular space defining a return vapor passage of said system;

supporting a product sensor on the exterior surface of the fill tube in the annular space thus crated between the exterior surface of the fill tube and the riser pipe interior surface, the product sensor being used to sense representative characteristics of a product located within the tank interior space;

saw cutting a shallow trench in the concrete apron, the shallow trench being less than the cross-sectional depth of the concrete apron;

electrically connecting a cable to the product sensor supported on the exterior surface of the fill tube located in the annular space and running the connecting cable through the shallow trench provided in the concrete apron to the computation means situated remotely at the surface of the ground; and leaving the product sensor so supported within the annular space of the coaxial vapor recovery refueling system during refueling of the underground storage tank.

5. The method of claim 4, wherein the shallow trench is sawcut with a concrete saw to a maximum width of 3/8 inch.

6. The method of claim 5, wherein the connecting cable run through the shallow trench is U.L. approved for direct burial.

7. The method of claim 6, further comprising the steps of:
   installing the product sensor by threadedly engaging an adapter onto an upper extent of the riser pipe, the adapter having a complementary profile for engaging a liquid vapor coupling and having a junction for joining the connecting cable to the product sensor so supported on the exterior surface of the fill tube in the annular space.

8. The method of claim 7, further comprising the steps of caulking the shallow trench containing the connecting cable with a mortar caulk.

9. A method for installing a product monitoring device in an underground fuel storage tank having an interior space, the tank being buried in an subterranean location beneath a concrete apron having a riser pipe extending upwardly therefrom to the surface of the ground, the riser pipe having an open interior surface which communicates with the interior space of the underground storage tank, a fill tube having an exterior surface and being spaced within the riser pipe, a nozzle coupling being threadedly attached to an upper extent of the riser pipe, the product monitoring device being used to output a signal representative of product characteristics of interest, the signal so output being monitored by computation means located at the surface, the method comprising the steps of:
   removing the nozzle coupling from the riser pipe;
   pulling the fill tube from the riser pipe;
   installing an adapter on an upper extent of the fill tube and engaging the adapter with the nozzle coupling;
   supporting a product sensor on the exterior surface of the fill tube;
   inserting the fill tube telescopingly within the riser pipe, and engaging the adapter to the riser pipe, said interior surface of said riser pipe thereby forming a coaxial vapor recovery refueling system having an annular space created between said exterior surface of said fill tube and said interior surface of said riser pipe, said annular space defining a return vapor passage of said system, the product sensor being located in the annular space so created between the exterior surface of the fill tube and the interior surface of the riser pipe; and leaving the product sensor so supported within the annular space of the coaxial vapor recovery refueling system during refueling of the underground fuel storage tank.

10. A method for installing a product monitoring device in an underground fuel storage tank having an interior space, the tank being buried in a subterranean location beneath a concrete apron having a cross-sectional depth and having a riser pipe extending upwardly therefrom to the surface of the ground, the riser pipe having an open interior surface which communicates with the interior space of the underground storage tank, a fill tube having an exterior surface and being spaced within the riser pipe, a nozzle coupling being threadedly attached to an upper extent of the riser pipe, the product monitoring device being used to output a signal representative of product characteristics of interest, the signal so output being monitored by computation means located at the surface, the method comprising the steps of:
   removing the nozzle coupling from the riser pipe;
   pulling the fill tube from the riser pipe;
   installing an adapter on an upper extent of the fill tube and engaging the adapter with the nozzle coupling;
   supporting a product sensor on the exterior surface of the fill tube;
   inserting the fill tube telescopingly within the riser pipe, and engaging the adapter to the riser pipe, said interior surface of said riser pipe thereby forming a coaxial vapor recovery refueling system having an annular space created between said exterior surface of said fill tube and said interior surface of said riser pipe, said annular space defining a return vapor passage of said system, the product sensor being located in the annular space so created between the exterior surface of the fill tube and the interior surface of the riser pipe;
   saw cutting a shallow trench in the concrete apron, the shallow trench being less than the cross-sectional depth of the concrete apron, whereby the shallow trench so cut has the appearance of an expansion joint in the concrete apron;
   electrically connecting a cable to the product sensor supported in the annular space and running the connecting cable through the shallow trench provided in the concrete apron to the computation means situated remotely at the surface; and
   leaving the product sensor so supported within the annular space of the coaxial vapor recovery refueling system during refueling of the underground fuel storage tank.

* * * * *